US006545596B1

(12) United States Patent
Moon

(10) Patent No.: US 6,545,596 B1
(45) Date of Patent: Apr. 8, 2003

(54) PRESENTING INFORMATION TO MOBILE TARGETS

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 09/609,098

(22) Filed: Jun. 30, 2000

(51) Int. Cl.[7] .................................................. B60Q 1/00

(52) U.S. Cl. .................................................. 340/425.5

(58) Field of Search ................................ 340/905, 901, 340/902, 425.5, 539; 701/207, 208

(56) References Cited

U.S. PATENT DOCUMENTS

| | | | | |
|---|---|---|---|---|
| 5,938,721 | A | 8/1999 | Dussell et al. | 701/211 |
| 5,959,577 | A | 9/1999 | Fan et al. | 342/357 |
| 6,021,371 | A | 2/2000 | Fultz | 701/200 |
| 6,169,894 | B1 * | 1/2001 | McCormick et al. | 455/414 |
| 6,199,045 | B1 | 3/2001 | Giniger et al. | 705/1 |
| 6,259,405 | B1 * | 7/2001 | Stewart et al. | 342/457 |

* cited by examiner

*Primary Examiner*—Daryl Pope
(74) *Attorney, Agent, or Firm*—Baker Botts L.L.P.

(57) ABSTRACT

An advertising system includes a mobile apparatus that determines location information and presents an advertisement based on the location information. The system may also include an output device that presents a selected advertisement based on audience information associated with mobile advertising targets.

33 Claims, 3 Drawing Sheets

68

| LOCATION | TIME | AUDIENCE | PRIORITY | ADVERTISEMENT |
|---|---|---|---|---|
| X | 07:00-09:00 | ANY | MEDIUM | 1 |
| | 11:00-13:00 | A,B,C | HIGH | 2 |
| | 11:00-13:00 | ANY | MEDIUM | 3 |
| | ANY | ANY | LOW | 4 |
| Y | ANY | ANY | LOW | 5 |
| | ANY | D | HIGH | 6 |
| ⋮ | ⋮ | ⋮ | ⋮ | ⋮ |

PRESENTING INFORMATION TO MOBILE TARGETS

TECHNICAL FIELD OF THE INVENTION

The present invention relates generally to information systems and more particularly to presenting information to mobile targets.

BACKGROUND OF THE INVENTION

Merchants spend vast sums each year attempting to deliver appropriate advertisements to a receptive audience. These merchants use many different marketing techniques and forms of media to present effective advertisements. Each day these advertisements flood our society through traditional methods such as billboards, television, and radio and through new high-tech media such as the Internet. However, merchants are consistently challenged to craft effective advertisements and to deliver these advertisements to a receptive audience.

SUMMARY OF THE INVENTION

In accordance with the present invention, techniques for presenting information to mobile targets are provided which substantially eliminate or reduce disadvantages and problems associated with previous techniques. In a particular embodiment, the present invention satisfies a need for a mobile advertising apparatus that determines a physical location and presents a selected advertisement based on the physical location.

According to one embodiment of the present invention, a mobile advertising apparatus includes a location device that determines a physical location of the apparatus, a controller that determines an advertisement based on the physical location, and an output device that presents the advertisement. More specifically, the mobile advertising apparatus may use a global positioning system (GPS) unit as the location device.

In accordance with another embodiment of the present invention, an advertising system includes a memory storing advertisements, an output device, and a controller for use in sending advertising to mobile advertising targets within an effective range of the output device. The controller identifies the mobile advertising targets, determines audience information associated with the mobile advertising targets, and selects one of the stored advertisements based on the audience information. The output device then presents the selected advertisement.

The invention provides a number of technical advantages. Using these techniques, merchants and advertisers may more effectively present advertisements to moving targets. For example, a mobile dynamic billboard, by determining its physical location, may present advertisements appropriate for that geographic region, such as for restaurants, hotels, or gas stations in the area. These advertisements may also be linked to specific times of day, such as advertisements for restaurants at dinner time and hotels later at night. In addition, these advertising systems may select advertisements based on audience information of mobile advertising targets. For example, the system may determine information associated with cars in a position to view an advertisement and display an advertisement based on that information. The advertisement displayed may then change as the composition of the audience changes. Thus, these advertising systems may present highly focused advertisements selected by combining location, time, audience, and/or other suitable information.

These advertisement systems may also be integrated into vehicles. For example, a dynamic billboard may be positioned on a long-haul truck, with an advertisement displayed based on location, time, and/or audience information. This dynamic billboard may be integrated with currently available systems on some vehicles, such as tracking devices and communications equipment. In addition, advertisements may link to additional information and services delivered by these advertising systems. For example, an advertisement for a song could direct a recipient to tune to a radio station to hear a sample or to visit a website to download an MP3 sample of the song. These examples clarify only particular advantages of the present invention. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF EXEMPLARY EMBODIMENTS

Figure 1:
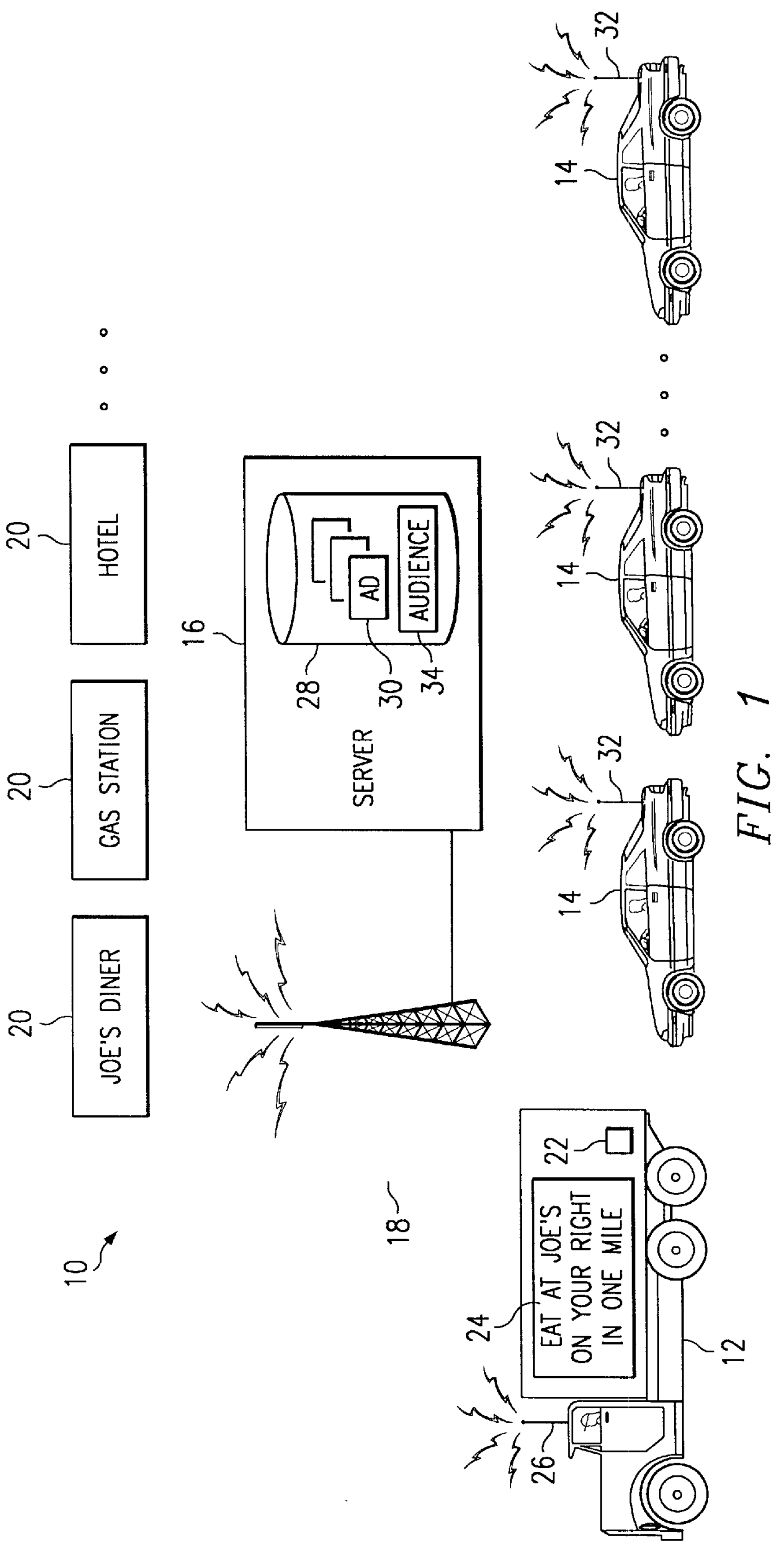
FIG. 1 illustrates an advertising system including a mobile advertising apparatus for presenting targeted information.

FIG. 1 illustrates an advertising system, indicated generally at 10, that includes a mobile advertising apparatus 12 for presenting targeting information to advertising targets 14 and a server 16 coupled to a base station 18 providing wireless communications. System 10 also includes merchants 20 who have subscribed to have advertisements presented by apparatus 12. In general, apparatus 12 determines location information using a location device 22 and presents an advertisement using an output device 24 based on the location information.

Apparatus 12 includes location device 22 and output device 24 and represents any hardware and/or software for presenting selected advertisements. Apparatus 12 may also include a communications interface 26 for wireless communications with other devices in system 10, such as communications with server 16 via base station 18. Apparatus 12 may be integrated with or implemented by components of a vehicle, radio, television, computer, personal digital assistant (PDA), mobile telephone, or other suitable equipment. Server 16 represents hardware and/or software that aids in operation, administration, and management of components in system 10, and may control and/or support apparatus 12. For example, server 16 may contain a server memory 28 storing advertisements 30 for presentation by apparatus 12. The components and operation of apparatus 12 and server 16 are discussed in greater detail with respect to FIGS. 3 and 4.

Advertising targets 14 represent equipment and/or people intended to receive advertisements presented by apparatus 12. For example, targets 14 may be automobiles, radios, televisions, computers, personal digital assistants (PDAs), or other equipment or users of this equipment where appropriate. Targets 14 may passively receive advertisements presented by apparatus 12 or may actively communicate information with apparatus 12, server 16, or other components in system 10 using a target interface 32. For example, target interface 32 may support Internet access allowing interactive sessions or may be a transponder, such as a toll-tag, providing identifying information or signals. System 10 contemplates target interface 32 supporting any appropriate interactions with apparatus 12 and server 16 using suitable communications protocols. Moreover, various targets 14 may include different types of target interfaces 32, and system 10 contemplates using multiple systems for identifying various targets 14. Merchants 20 represent users of the advertising services provided by apparatus 12. Thus, merchants 20 may be any equipment or entity providing information or content for delivery to targets 14 using apparatus 12.

In operation, apparatus 12 uses location device 22 to determine a physical location. Based on this location, apparatus 12 determines and presents an advertisement using output device 24. To present the selected advertisement, apparatus 12 may use any suitable means for delivering information. Thus, output device 24 may be a visual display device, an audio output device, a radio transmitter or any other device appropriate for making information available to targets 14. Moreover, output device 24 may use multiple techniques for delivering information to targets 14. For example, output device 24 may include a billboard that directs targets 14 to access additional information delivered via a separate communications technique, such as a short range radio broadcast or a wireless local area network (LAN).

Apparatus 12 may use any suitable technique for determining an appropriate advertisement to present based on location information. For example, apparatus 12 may select an advertisement based on proximity to a specific merchant 20 responsible for the advertisement. To enable selection of an advertisement, apparatus 12 or server 16 may maintain a table mapping advertisements to specific geographic regions. Thus, for example, a vehicle equipped with apparatus 12 could display targeted advertisements based on its current physical location. In addition, apparatus 12 may use other information to fine tune the advertisement selected. Using information such as the current time or the composition of targets 14, apparatus 12 may select and present an appropriate advertisement.

In a particular embodiment, apparatus 12 uses the current time, in addition to location, to aid in determining an appropriate advertisement. For example, around dinnertime, apparatus 12 may present advertisements for nearby restaurants, while later in the evening, apparatus 12 may present advertisements for hotels in the area. According to another embodiment, system 10 may capture audience information associated with targets 14 and use this information in combination with the location information to determine an advertisement to present. For example, targets 14 may have target interfaces 32, such as toll-tag transponders installed in many automobiles, that provide identifying information or signals. Therefore, target interfaces 32 may allow apparatus 12, server 16, or other suitable equipment to associate targets 14 with audience information. Thus, to more finely tune the advertisements presented, apparatus 12 may determine audience information 34 associated with targets 14 and integrate this information with location information to determine an appropriate advertisement. Audience information 34 may include profiles associated with individual targets 14, group profiles associated with a type of target 14, or other appropriate audience characteristics for selecting from advertisements 30. Furthermore, audience information 34 may include a database of characteristics and information for potential audience targets that server 16 or other equipment accesses to determine information associated with targets 14.

Thus, an advertisement may be selected based on a physical location in addition to the current audience. For example, if targets 14 include a high percentage of luxury automobiles, advertisements may be directed to a more affluent market, while a prevalence of inexpensive or unidentifiable cars may call for a different type of advertisement. In addition, the advertisement selected and presented may change based on the changing composition of targets 14. To alleviate privacy concerns, system 10 contemplates various methods for virtually anonymous association of targets 14 to audience information 34. Targets 14 may be associated with group or individual profiles of audience information 34 without requiring a precise identity to be associated with target 14. For example, a system similar to Internet "cookies" may be implemented to anonymously associate audience information 34 with targets 14, or a particular target 14 may be associated with a large group, such as truck owners. However, system 10 contemplates using any suitable techniques and/or equipment for associating some or all of targets 14 with audience information 34.

In addition, system 10 contemplates using any suitable combination of criteria, such as location, time, and audience information 34, to determine an appropriate advertisement for presentation using apparatus 12. Furthermore, while these examples involve apparatus 12 selecting an advertisement to present, any component in system 10 may select one or more advertisements for presentation. For example, server 16, in communication with apparatus 12, may select from advertisements 30 using any suitable information and technique.

While apparatus 12 may act autonomously, it may also share tasks and information with other devices through wireless communications using interface 26. In a particular embodiment, server 16 may provide a centralized storehouse of advertisements 30 using server memory 28, and may additionally select advertisements for presentation based on location information uploaded from apparatus 12. For example, apparatus .12 may determine a current physical location using location device 22 and then communicate this location to server 16 using a wireless link between communications interface 26 and base station 18. Server 16 may then access advertisements 30 stored in server memory 28 to determine an appropriate advertisement for the geographic location of apparatus 12. Server 16 then downloads the selected advertisement 30 using the wireless link for display by apparatus 12.

However, system 10 contemplates using any suitable components, distributed or concentrated, for storing advertisements 30 and audience information 34 and for determining an appropriate advertisement 30 to present. For example, apparatus 12 may store advertisements 30 and/or audience information 34 in a local memory and/or make determinations as to an appropriate advertisement to present. Moreover, apparatus 12 may download and store some or all of advertisements 30 from server 16 at any appropriate time based on a planned route or other information. While apparatus 12 may operate without using a communications link to server 16, the use of server 16 would allow for centralized control, decision making, and management of multiple apparatuses 12 at different physical locations.

Wireless communications between communications interface 26 and base station 18 may use any one or combination of suitable wireless communications protocols. For example, base station 18 may be a digital or analog cellular base station, a satellite, a wireless local area network (LAN) station, or any other suitable equipment for wireless communications with apparatus 12. Moreover, communications interface 26 may support multiple forms of wireless communications. Therefore, base station 18 may represent multiple devices at various locations providing wireless communications with apparatus 12 using a variety of communications protocols. While the preceding discussion focuses on particular functionalities for specific components, system 10 contemplates any suitable distribution or combination of functions and components that includes a mobile apparatus for presenting advertisements based on its physical location.

Figure 2:
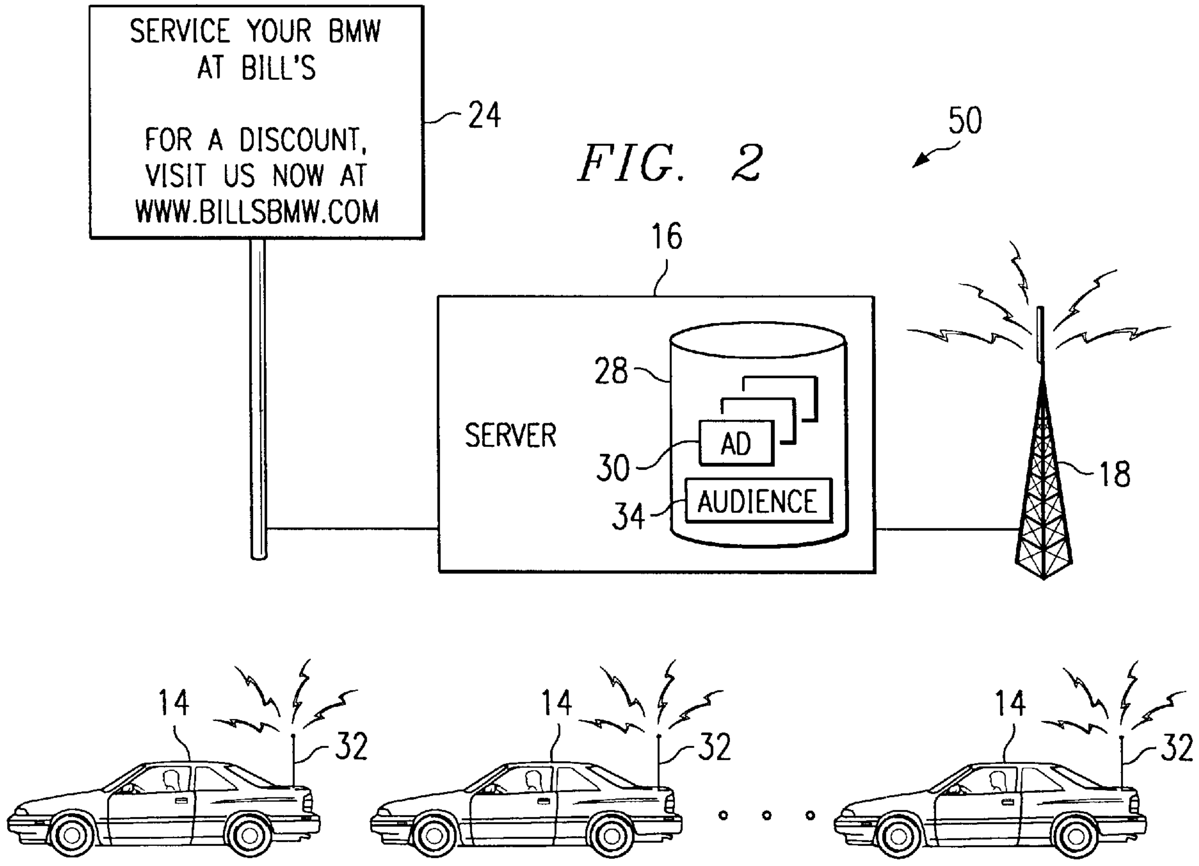
FIG. 2 illustrates an advertising system for presenting targeted information based on audience information.

FIG. 2 illustrates an alternative embodiment of an advertising system, indicated generally at 50, in which output device 24 presents advertisements based on audience information associated with targets 14. System 50 includes output device 24, server 16, base station 18, and targets 14. In general, server 16 uses base station 18 to determine audience information 34 associated with targets 14 within an effective range of output device 24. Based on this audience information 34, server 16 selects one of advertisements 30 from server memory 28 and presents the selected advertisement 30 using output device 24.

In operation, some or all of targets 14 are equipped with target interfaces 32 that enable server 16 to determine associated audience information 34. For example, targets 14 may be automobiles equipped with toll-tag transponders, and base station 18 may represent equipment at a toll booth identifying each target 14. Server 16, using any suitable technique, uses these identifications to determine associated audience information 34. For example, each identity may be associated with a profile, or, for simplification or to alleviate privacy concerns, each identity may link only to generalized information, such as a type of automobile. Based on audience information 34 for some or all of targets 14 in range of output device 24, server 16 selects one or more of advertisements 30 to present. As previously discussed, output device 24 represents any suitable visual, audio, or other transmission device for delivering information to targets 14. Moreover, while this example illustrates specific components for displaying advertisements 30 based on audience information 34, some or all of the functionalities described for output device 24, server 16, and base station 18 may be implemented within a mobile apparatus, such as apparatus 12. For example, apparatus 12 may use communications interface 26 to identify targets 14 and obtain associated audience information 34. Thus, apparatus 12 may present advertisements based solely on audience information 34 for targets 14 within an effective range.

In both system 10 and system 50, advertisements presented using output device 24 may offer additional services or direct targets 14 to additional sources of information. For example, a selected advertisement may direct targets 14 to a website offering additional information or coupons associated with the original advertisement. Moreover, apparatus 12 may enable targets 14 to access additional information using techniques such as low-power radio transmissions or wireless local area network (LAN) services. For example, a song advertised using output device 24 may be instantly downloadable as an MP3 file using a wireless LAN or may be broadcast using a low-power radio transmission. In some cases, apparatus 12 may be well suited for installation on large vehicles, such as long-haul trucks. These large vehicles typically have excess hauling capacity that may be used to install equipment, such as communications equipment for establishing high-bandwidth, wireless links with remote servers or for enabling wireless LANs for targets 14 in close proximity.

Figures 3, 5:
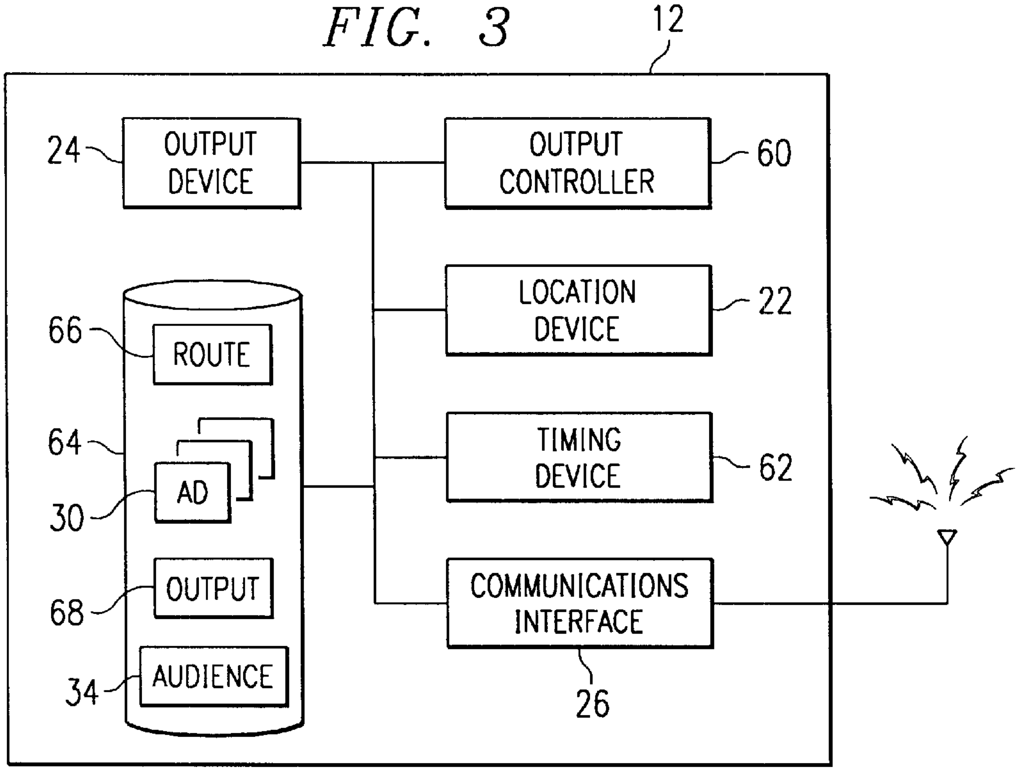
FIG. 3 is a block diagram illustrating the apparatus for presenting targeting information.
FIG. 5 is a table illustrating exemplary information used to select targeted information to present.

FIG. 3 illustrates the functional components of an exemplary mobile advertising apparatus 12, including an output controller 60 coupled to location device 22, output device 24, communications interface 26, a timing device 62, and a local memory 64. In a particular embodiment, apparatus 12 determines a physical location using location device 22 and presents a selected advertisement based on this physical location. In an alternate embodiment, apparatus 12 presents a selected advertisement based on audience information 34 associated with targets 14. However, apparatus 12 may present an advertisement selected using any suitable combination of criteria.

Location device 22 provides physical location information using any suitable technique. For example, location device 22 may access global positioning system (GPS) signals, cellular system signals, or other signals to determine a physical location. Moreover, location device 22 may use timing device 62 in combination with a route table 66 maintained in memory 64 to determine a current physical position along a predetermined route. For example, apparatus 12 may be installed on a bus, train or other vehicle that travels along a predetermined route, with location device 22 determining location information by accessing route table 66. System 10 contemplates location device 22 accessing any information or signals and using any suitable techniques for determining an approximate or precise physical location.

Timing device 62 provides timing capabilities and may also determine a current time or date. Communications interface 26 provides one or more forms of wireless communications with other devices in system 10. For example, communications interface 26 may support wireless links with digital or analog cellular networks, satellite links, or with other wireless systems. In addition, communications interface 26 may support wireless LANs between apparatus 12 and other equipment in system 10, such as targets 14 with networking capabilities. Moreover, communications interface 26 may access identifying equipment on targets 14, such as target interfaces 32, to enable an association of targets 14 to audience information 34.

Memory 64 represents any one or a combination of volatile or non-volatile, local or remote devices suitable for storing data, for example, random access memory (RAM) devices, read only memory (ROM) devices, magnetic storage devices, optical storage devices, or any other suitable data storage devices. Memory 64 may maintain information such as route table 66, advertisements 30, an output table 68, or other suitable information. As discussed above, location device 22 may use route table 66 to determine location information. Output table 68 represents any information used by apparatus 12 or server 16 in determining an advertisement to present based on location information. For example, output table 68 may have advertisements indexed by geographic region, time of day, audience information 34, or other suitable selection criteria. While this example illustrates memory 64 within apparatus 12, system 10 contemplates memory 64 residing wholly or partially within other devices in system 10. For example, memory 64 may be all or a portion of server memory 28. Thus, system 10 contemplates distributed and/or centralized management, storage, and control of advertisements presented using output device 24.

In operation, output controller 60 determines location information using location device 22, determines an appropriate advertisement 30 based on the location information, and directs output device 24 to present the selected advertisement 30. Output controller 60 may access timing device 62, route table 66, output table 68, or other suitable information or components to determine the appropriate advertisement 30. Moreover, output controller 60 may communicate information with remote equipment via communications interface 26 to determine the appropriate advertisement 30. For example, output controller 60 may determine location information using location device 22, communicate this location information to server 16, and receive a selected advertisement 30 from server 16. Output device 24 then presents one or more advertisements 30 to targets 14.

While this example illustrates specific functional modules for apparatus 12, system 10 contemplates implementing the functionalities described using any suitable combination and arrangement of hardware and/or software. In addition, functionalities from each of these modules and those from server 16 may be combined or separated into smaller or larger functional units when appropriate, and any of the methods or functionalities described may be implemented by a computer program stored on a computer readable medium.

Figure 4:
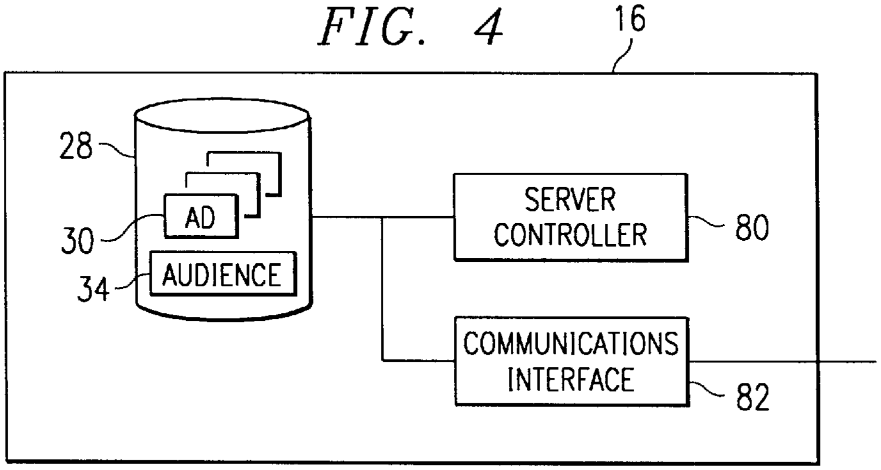
FIG. 4 is a block diagram of a server for managing and controlling the presentation of targeted information.

FIG. 4 illustrates the functional components of an exemplary server 16, including a server controller 80 coupled to a server communications interface 82 and server memory 28. In general, server 16 controls the operation, administration, and management of components within system 10, including apparatus 12. Moreover, server 16 may select advertisements 30 for presentation using output device 24 based on any suitable criteria, such as audience, location, timing, or other suitable information.

Similar to memory 64, memory 28 may be any suitable combination of local or remote memory storage devices. Memory 28 may store advertisements 30 in addition to other information, such as route tables 66, output tables 68, or additional information. Server communications interface 82 provides wireless or wireline connectivity to other devices in system 10 using any suitable communication protocol. In a particular embodiment, interface 82 couples to base station 18, which provides a wireless link with apparatus 12.

In operation, server 16 may directly control output device 24, as in system 50, or may provide support for apparatus 12, as in system 10. For example, server 16 may receive location information, timing information, audience information 34, and/or other suitable information from apparatus 12 and use this information to select from advertisements 30. Server 16 then communicates the selected advertisement 30 to apparatus 12 using server communications interface 82.

In a particular embodiment, server 16 operates as a centralized storehouse of advertisements 30. For example, server 16 may store a list of available advertisements 30 in server memory 28. Server 16 then downloads some or all of these advertisements 30 to apparatuses 12 at remote locations. Alternatively, some or all of advertisements 30 stored in server memory 28 may be downloaded at the request of apparatuses 12. A centralized database allows single point management of advertisements 30, and, for example, allows server 16 to download a portion of advertisements 30 appropriate for a current or anticipated geographic location of a particular apparatus 12. However, system 10 contemplates storage and distribution of advertisements 30 among any suitable components.

While this example illustrates specific functional modules for server 16, system 10 contemplates implementing the methods and functionalities described using any suitable combination and arrangement of hardware and/or software. Moreover, as previously discussed, functionalities from the modules in server 16 and those from apparatus 12 may be combined or separated into smaller or larger functional units of a centralized or distributed system, and any of the methods or functionalities described may be implemented by a computer program stored on a computer readable medium.

FIG. 5 illustrates an exemplary output table 68 maintaining information for selecting one or more of advertisements 30 to present using output device 24. In this example, advertisements are selected based on location information, time information, audience information 34, and a priority for the advertisement. Thus, apparatus 12 in location X displays one of four advertisements based on the time of day and the audience. For example, during morning rush-hour, apparatus 12 at location X will display advertisement #1 regardless of the audience. During the lunch hours, apparatus 12 selects between advertisement #2 and #3 based upon audience information 34. For example, apparatus 12 at location X during lunchtime and detecting audience characteristics A, B, or C presents advertisement #2, but will default to presenting advertisement #3 if those audience characteristics are not detected. At all other times, apparatus 12 at location X presents advertisement #4 as a default. However, these advertising selections and the criteria used are meant only to illustrate a specific example of the operation of apparatus 12. System 10 contemplates selecting from advertisements 30 using any appropriate criteria. Furthermore, while this example illustrates selection criteria associated with advertisement 30 in table form, system 10 may store this information using other suitable arrangements and storage techniques.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A mobile advertising apparatus comprising:

a location device operable to determine a first physical location of the apparatus and to determine a second physical location of the apparatus, the second physical location remote from the first physical location;

a controller operable to determine a first advertisement based on the first physical location and to determine a second advertisement based on the second physical location; and an output device operable to present the first advertisement to a first group of mobile advertising targets within an effective range of the output device at the first physical location and to present the second advertisement to a second group of mobile advertising targets within an effective range of the output device at the second physical location.

2. The mobile advertising apparatus of claim 1, wherein the location device comprises a global positioning system (GPS) unit.

3. The mobile advertising apparatus of claim 1, further comprising a communications link, and wherein, to determine the first advertisement, the controller is further operable to:

communicate the first location to a remote server using the communications link; and receive the first advertisement from the server using the communications link.

4. The mobile advertising apparatus of claim 1, further comprising a memory storing a plurality advertisements associated with corresponding geographic regions, and wherein, to determine the first advertisement, the controller is further operable to select one of the advertisements stored in the memory based on the first location.

5. The mobile advertising apparatus of claim 1, further comprising a communications link and a memory, and wherein the controller is further operable to:

receive a plurality of advertisements from a remote server using the communications link;

store the advertisements received from the server using the memory; and determine the first advertisement to present by selecting one of the advertisements stored in the memory based on the first location.

6. The mobile advertising apparatus of claim 1, wherein the output device comprises a selected one of a visual display device, an audio output device, and a radio transmitter.

7. The mobile advertising apparatus of claim 1, wherein the controller is further operable to:

determine a current time; and determine the first advertisement based on the first location and the current time.

8. The mobile advertising apparatus of claim 1, wherein the controller is further operable to:

identify a plurality of mobile advertising targets, wherein the identified mobile advertising targets are within an effective range of the output device;

determine audience information associated with the identified mobile advertising targets; and determine the first advertisement based on the first location and the audience information.

9. An advertising system for presenting advertisements to a plurality of mobile advertising targets within an effective range of a billboard comprising:

a memory storing a plurality of advertisements;

a controller operable to identify the mobile advertising targets, determine audience information associated with the mobile advertising targets, and determine a selected one of the advertisements based on the audience information; and the billboard operable to visually present the selected advertisement for viewing by the mobile advertising targets.

10. The system of claim 9, wherein the mobile advertising targets comprise vehicles.

11. The system of claim 9, wherein:

the mobile advertising targets comprise transponders; and the controller is further operable to communicate with the transponders to identify the mobile advertising targets.

12. The system of claim 9, wherein the controller is further operable to:

determine a current time; and determine the advertisement based on the audience information and the current time.

13. A method for presenting advertisements comprising:

determining a first physical location of a mobile output device;

determining a first advertisement based on the first physical location;

presenting the first advertisement using the output device to a first group of mobile advertising targets within an effective range of the output device at the first physical location;

determining a second physical location of a mobile output device, the second physical location remote from the first physical location;

determining a second advertisement based on the second physical location; and presenting the second advertisement using the output device to a second group of mobile advertising targets within an effective range of the output device at the second physical location.

14. The method of claim 13, wherein determining the first physical location comprises accessing a global positioning system (GPS) unit to determine the first physical location of the mobile output device.

15. The method of claim 13, wherein determining the first advertisement comprises:

communicating the first location to a remote server; and receiving the first advertisement from the remote server.

16. The method of claim 13, wherein determining the first advertisement comprises selecting one of a plurality of advertisements stored in a local memory based on the first location.

17. The method of claim 13, wherein the output device comprises a selected one of a visual display device, an audio output device, and a radio transmitter.

18. The method of claim 13, further comprising:

determining a current time; and determining the first advertisement based on the first location and the current time.

19. The method of claim 13 further comprising:

identifying a plurality of mobile advertising targets within an effective range of the output device;

determining audience information associated with the identified mobile advertising targets; and determining the first advertisement based on the first location and the audience information.

20. Software for presenting advertisements operable to:

determine a first physical location of a mobile output device;

determine a first advertisement based on the first location of the output device;

present the first advertisement using the output device to a first group of mobile advertising targets within an effective range of the output device at the first physical location;

determine a second physical location of a mobile output device, the second physical location remote from the first physical location;

determine a second advertisement based on the second physical location; and present the second advertisement using the output device to a second group of mobile advertising targets within an effective range of the output device at the second physical location.

21. The software of claim 20, further operable to determine the first physical location of the mobile output device by accessing a global positioning system (GPS) unit.

22. The software of claim 20, further operable to:

communicate the first location to a remote server; and receive the first advertisement from the remote server.

23. The software of claim 20, further operable to determine the first advertisement by selecting one of a plurality of advertisements stored in a local memory based on the first location.

24. The software of claim 20, wherein the output device comprises a selected one of a visual display device, an audio output device, and a radio transmitter.

25. The software of claim 20, further operable to:

determine a current time; and determine the first advertisement based on the first location and the current time.

26. The software of claim 20, further operable to:

identify a plurality of mobile advertising targets within an effective range of the output device;

determine audience information associated with the identified mobile advertising targets; and determine the first advertisement based on the first location and the audience information.

27. A mobile advertising apparatus comprising:

means for determining a first physical location of a mobile output device;

means for determining a first advertisement based on the first physical location;

means for presenting the first advertisement to a first group of mobile advertising targets within an effective range of the output device at the first physical location;

means for determining a second physical location of a mobile output device, the second physical location remote from the first physical location;

means for determining a second advertisement based on the second physical location; and means for presenting the second advertisement using the output device to a second group of mobile advertising targets within an effective range of the output device at the second physical location.

28. The apparatus of claim 27, wherein the means for determining the first physical location comprises means for accessing a global positioning system (GPS) unit to determine the first physical location of the mobile output device.

29. The apparatus of claim 27, wherein the means for determining the first advertisement comprises:

means for communicating the first location to a remote server; and means for receiving the first advertisement from the remote server.

30. The apparatus of claim 27, wherein the means for determining the first advertisement comprises means for selecting one of a plurality of advertisements stored in a local memory based on the first location.

31. The apparatus of claim 27, further comprising:

means for determining a current time; and means for determining the first advertisement based on the first location and the current time.

32. The apparatus of claim 27, further comprising:

means for identifying a plurality of mobile advertising targets within an effective range of the output device;

means for determining audience information associated with the identified mobile advertising targets; and means for determining the first advertisement based on the first location and the audience information.

33. A vehicle comprising:

a wheeled motive mechanism for moving the vehicle from a first physical location to a second physical location;

a global positioning system (GPS) unit operable to determine a current physical location of the vehicle;

a controller operable to determine a first advertisement based on the first physical location and to determine a second advertisement based on the second physical location; and a billboard operable to visually present the first advertisement to a first group of mobile advertising targets when the GPS unit determines that the vehicle is near to the first physical location, the output device further operable to present the second advertisement to a second group of mobile advertising targets when the GPS unit determines that the vehicle is near to the second physical location.

* * * * *